United States Patent [19]

Lindblad

[11] 4,306,370
[45] Dec. 22, 1981

[54] ANIMAL TRAP

[76] Inventor: Oskar L. Lindblad, Hedasgatan 16, 2-440 20 Vargarda, Sweden

[21] Appl. No.: 974,040

[22] Filed: Dec. 28, 1978

[30] Foreign Application Priority Data

Mar. 28, 1978 [SE] Sweden .............................. 7803405
Dec. 4, 1978 [SE] Sweden ............................ 78124328

[51] Int. Cl.³ .......................................... A01M 23/30
[52] U.S. Cl. ............................................ 43/82; 43/86
[58] Field of Search ..................... 43/81, 81.5, 82, 83, 43/86

[56] References Cited

U.S. PATENT DOCUMENTS

| | | | |
|---|---|---|---|
| 543,206 | 7/1895 | Butzer | 43/86 |
| 619,754 | 2/1899 | Hunter | 43/82 |
| 995,733 | 6/1911 | Stilson | 43/81 |
| 998,047 | 7/1911 | Stilson | 43/81 |
| 1,207,991 | 12/1916 | Owen | 43/81 |
| 1,455,131 | 5/1923 | Ziola | 43/82 |
| 1,794,463 | 3/1931 | Kelp | 43/81 |

FOREIGN PATENT DOCUMENTS 501765  4/1954  Canada ............................ 43/81.5

*Primary Examiner*—Harold D. Whitehead

[57] ABSTRACT

The invention relates to an animal trap comprising a tunnel shaped housing, which is open at one of its ends, at the opening or entrance end of which housing a clamping device is provided, which is movable in the cross direction of the housing, the clamping device being released by actuation of a sensing organ located behind the same.

2 Claims, 20 Drawing Figures

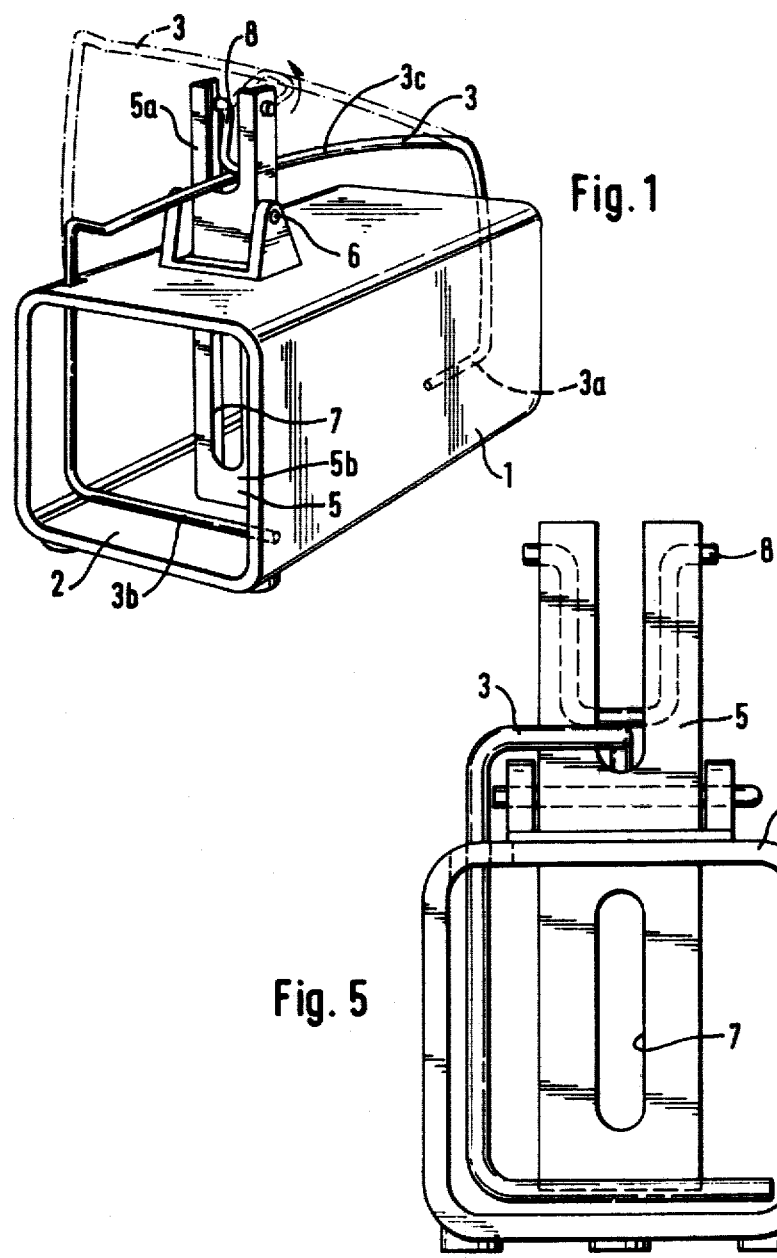

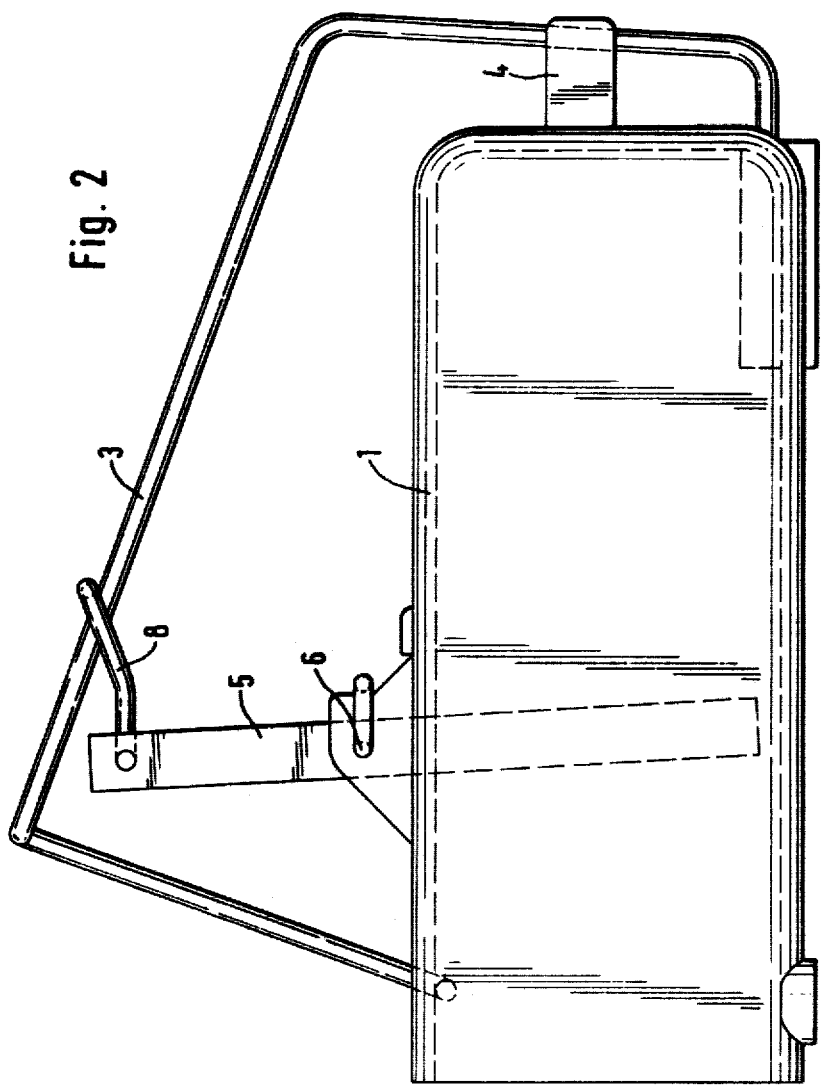

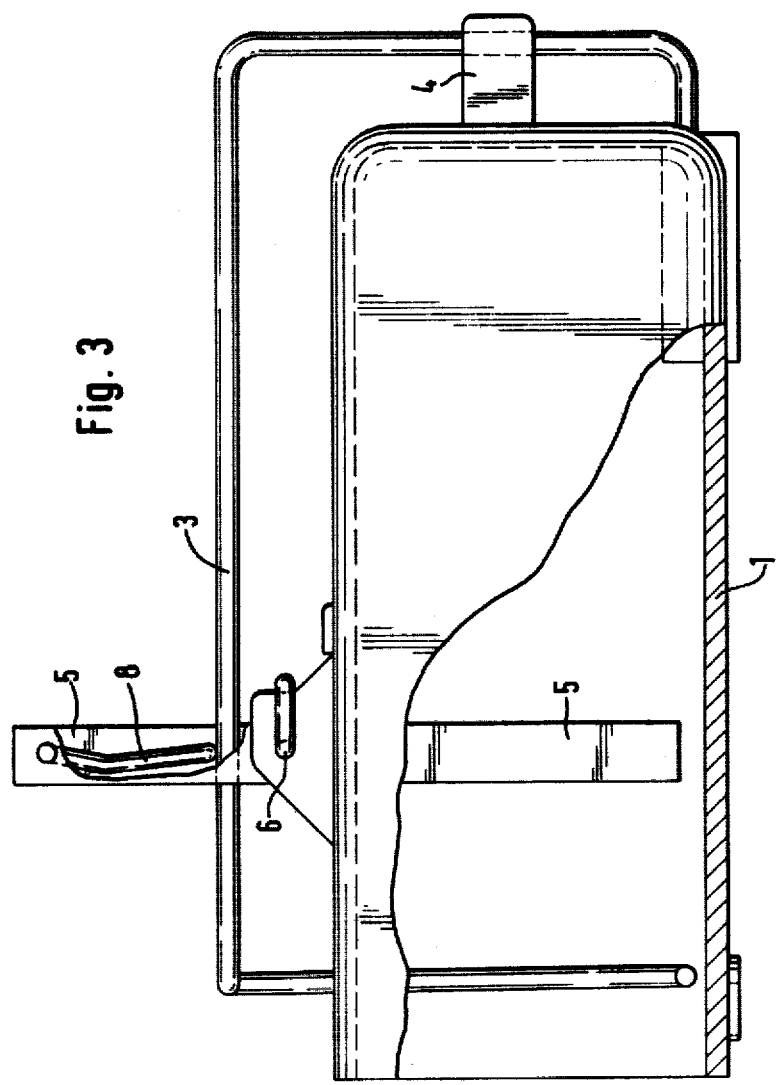

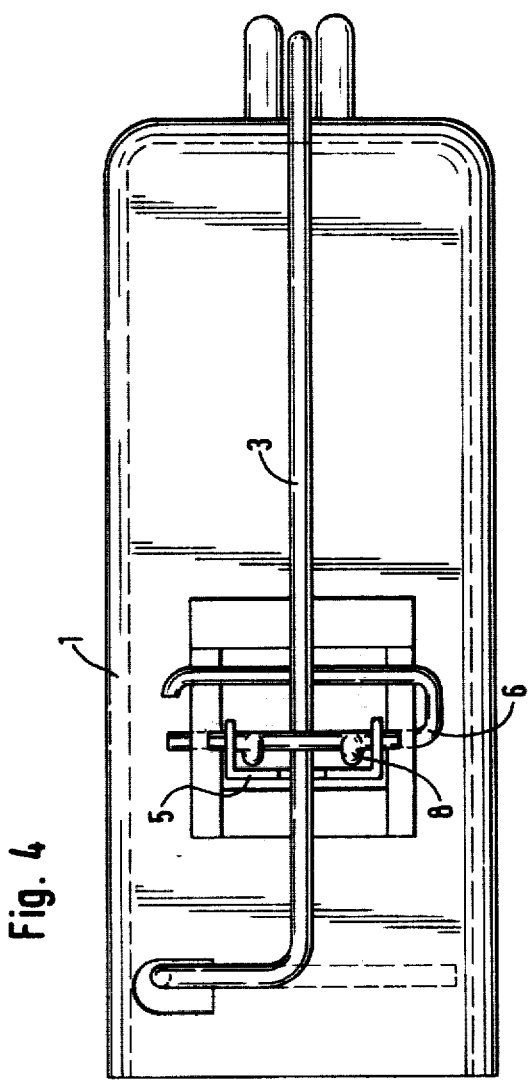

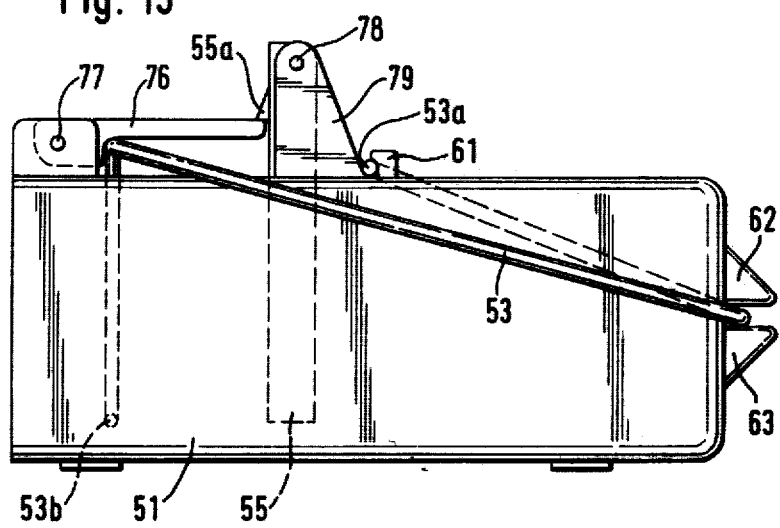
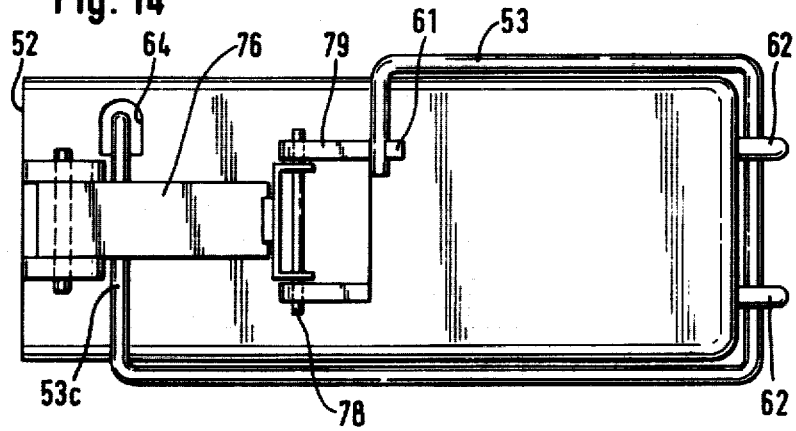

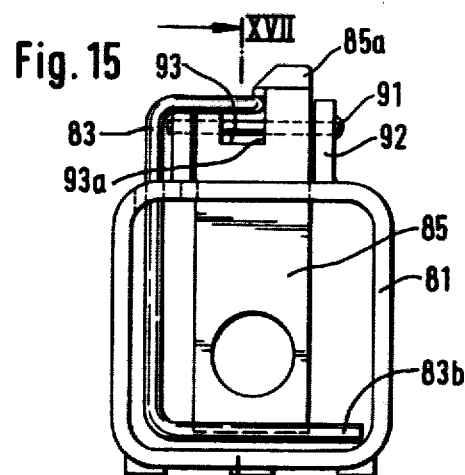
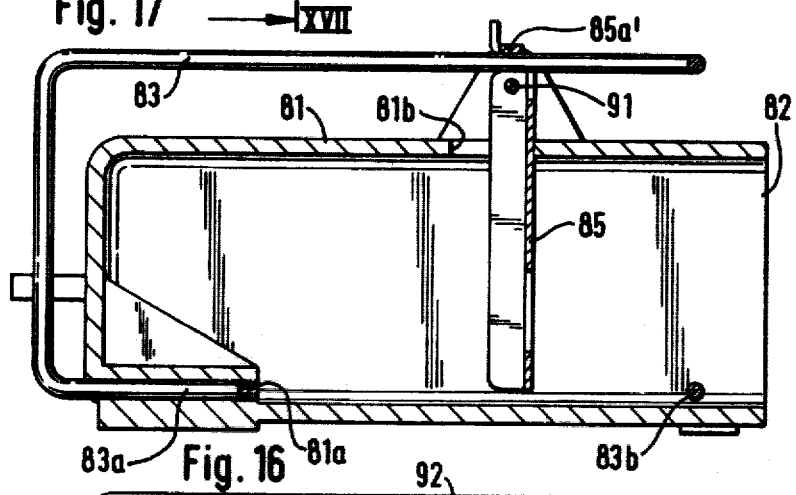
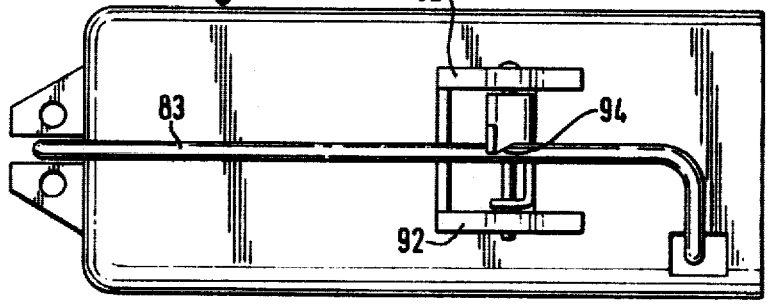

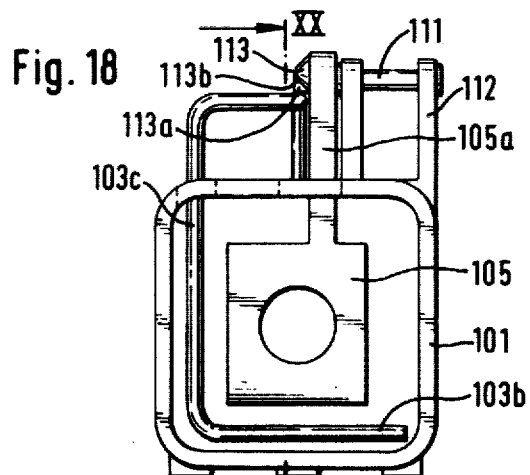
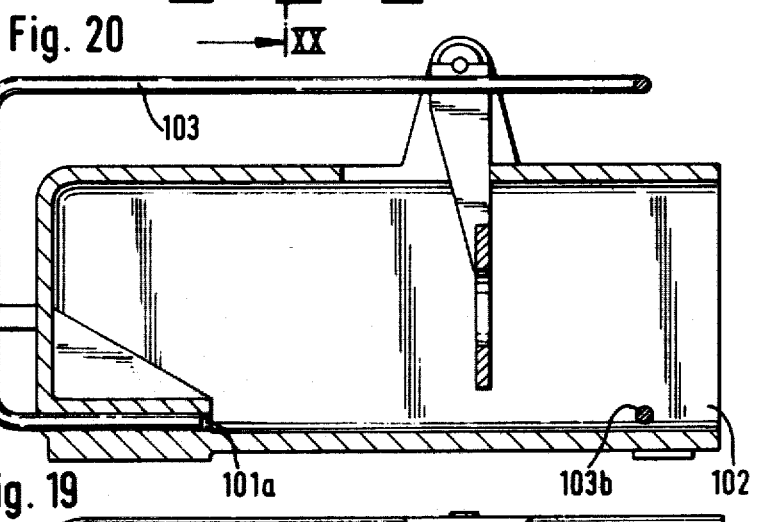
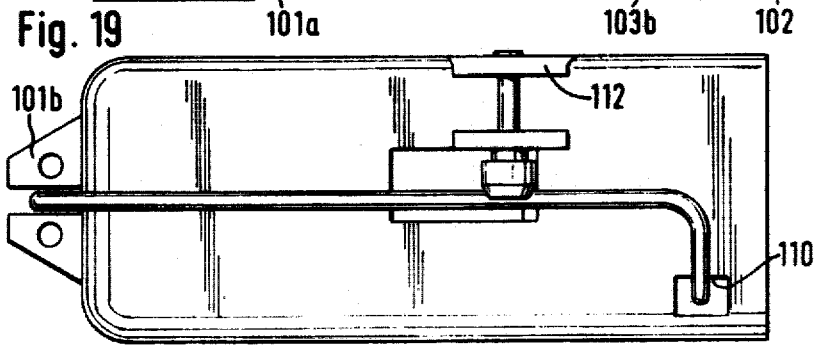

ANIMAL TRAP

The present invention relates to an animal trap preferably for animals of small size like rats, mice and similar.

It is a principal object of the invention to provide an animal trap with a reliable function, and which is easily activated and also in other respects is easy to handle, by means of which trap the animals caught can be killed without any prolonged agony, as is otherwise usually the case with conventional traps of the kind mentioned.

This object is reached by means of the invention, which is substantially characterized by the trap comprising a tunnel shaped housing with an entrance opening at one of its ends, a clamping means, which can be locked and is placed inside said housing, and which under the actuation of a spring in activated position can be moved in the cross direction of the housing, and a sensing member placed after the clamping means as counted in the direction from the entrance opening towards the interior and located in the passage leading to the point of the trap, where a bait is placed, which sensing member is arranged when contacted to trigger the clamping means, so that by said spring actuation it can be brought to perform said clamping movement.

Figure 6:
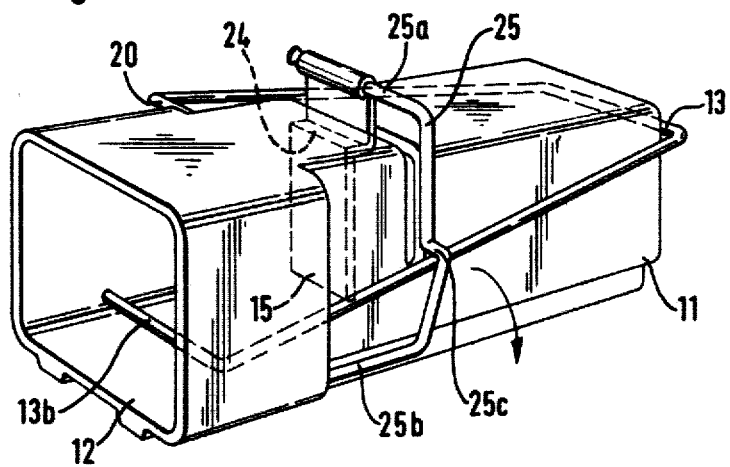
Figure 7:
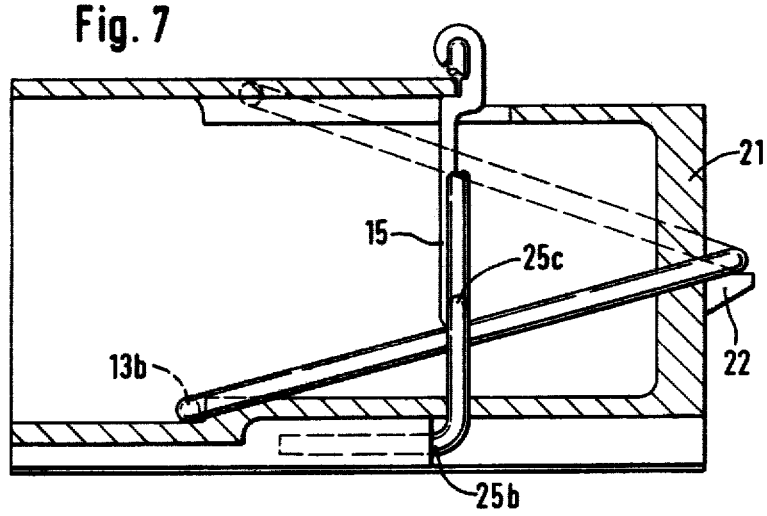
Figure 8:
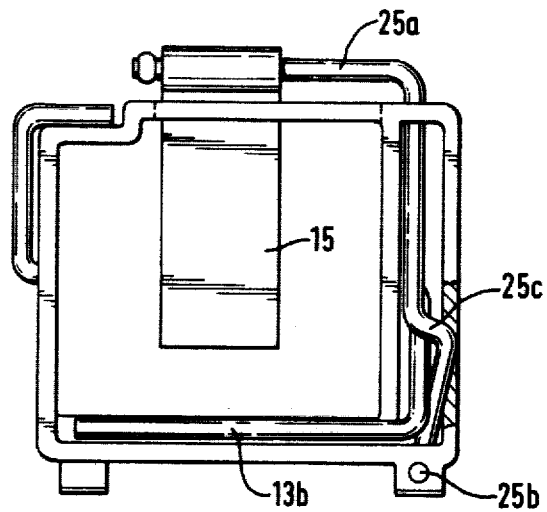
Figure 9:
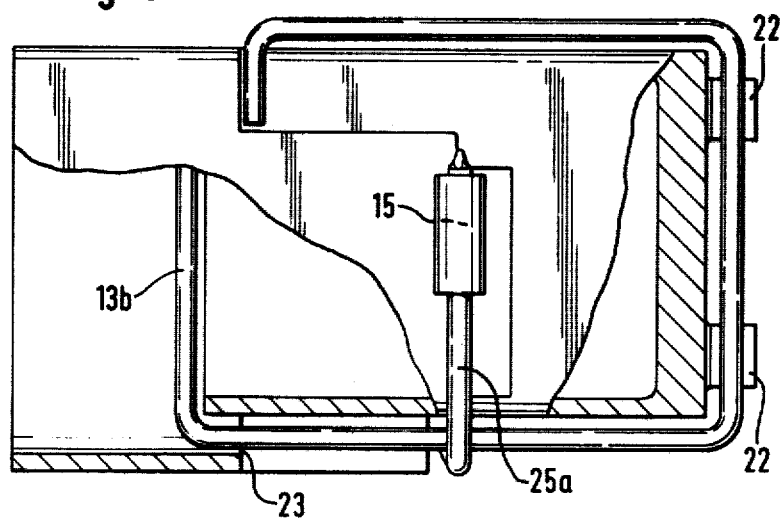
Figure 10:
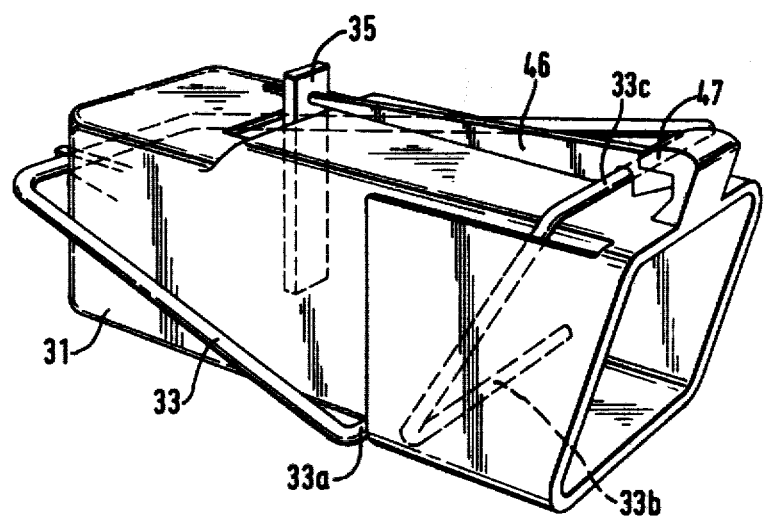
Figure 11:
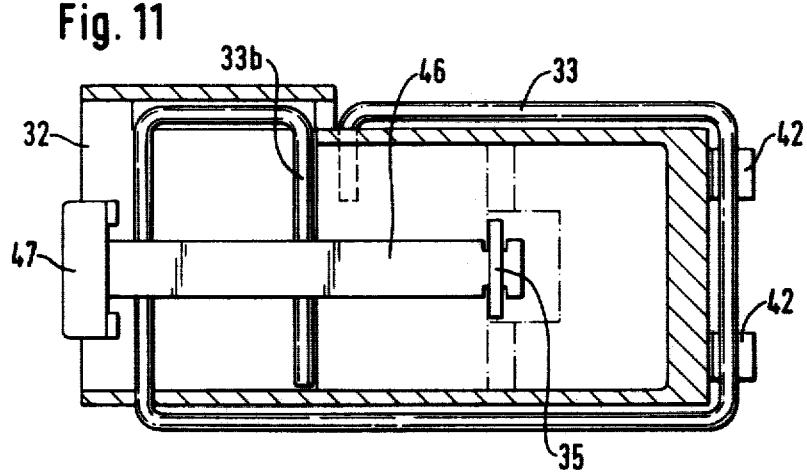
Figure 12:
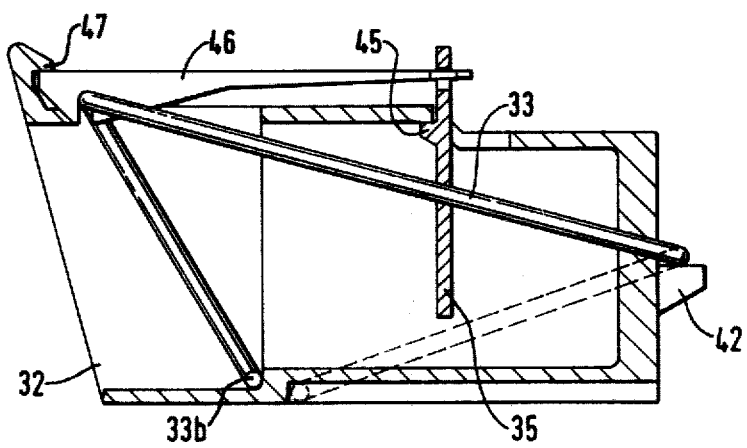

In the following a few examples of embodiment of the invention will now be described, reference being made to the accompanying drawings, in which FIG. 1 is a perspective view of a trap according to a first example of embodiment, FIG. 2 is a side elevational view of the same trap in triggered condition, FIG. 3 is a partly sectional view of the same trap in triggered condition and for the rest corresponding to the side elevational view of FIG. 2, FIG. 4 is a top view of the trap according to FIG. 3, FIG. 5 is a view as seen from the left according to FIG. 3, FIG. 6 is a perspective view corresponding to the one of FIG. 1 and showing a second example of embodiment, FIG. 7 is a partly sectional side elevational view of the trap shown in FIG. 6, FIG. 8 is a view as seen from the left according to FIG. 7, FIG. 9 is a partly sectional top view of the trap shown in FIG. 6, FIG. 10 is a perspective view of the trap made according to a third example of embodiment of the invention and showing the trap in activated condition, FIG. 11 is a top view of the trap illustrated in FIG. 10, the housing being sectioned by a horizontal cut, FIG. 12 is a side elevational view of the same trap, in which the housing is sectioned by a vertical cut, FIGS. 13 and 14 are a side elevational view and a top view respectively of a trap made according to a fourth example of embodiment, FIGS. 15-17 are a front view, a top view and a vertical longitudinal cross sectional view respectively through a trap made according to a fifth example of embodiment, and FIGS. 18-20 are a front view, a top view, and a longitudinal cross sectional view respectively of a trap made according to the invention according to a sixth example of embodiment.

The trap illustrated in the FIGS. 1-5 comprises a tunnel shaped housing 1, which is closed at one of its ends, at the opposite end having an entrance opening 2.

A shackle of spring steel is indicated with 3, one end portion 3a of the same being inserted into a bore in the rear portion of the housing 1, while the other end portion 3b is located inside the housing near to the entrance opening, where it forms a clamping bar extending in the cross direction of the housing. At the rear the housing has a projection 4, which forms a support for the attaching portion of the shackle 3. The shackle 3 is suitably made of spring steel and is under such tension that it tends to occupy the position illustrated in FIG. 2, in which the clamping bar 3b due to the remaining spring force lies against the top side of the housing. A sensing member indicated with 5 is placed after the clamping bar 3b in the passage leading to the point intended to receive a bait. This bait is suitably placed somewhere near to the inner end wall of the housing. The sensing body 5 is designed as a double-armed lever extending through the top wall of the housing and being pivotably connected with the housing by means of a shaft 6. The upper portion of the lever 5 is indicated with 5a and the lower portion of the lever located inside the housing is indicated with 5b. In order not to cause a too marked sight and smell impediment in front of the bait, the lower arm portion 5b is provided with a slit-shaped opening 7. For rigidity's sake the lever arm 5 is designed with lateral flanges in order to form a U-shaped section. The free end of the upper lever arm 5a has the shape of a fork, between the legs of which the spring shackle 3 extends. Near to the upper ends of the fork legs a triggering arm 8 is journalled, as is most clearly evident from the FIGS. 2 and 3, and is bent in such a manner that in the locking position shown in FIG. 3 it is lying against the lever arm 5a in such a way that the force, with which the spring shackle 3 acts upon the articulated system formed by the triggering arm 8 and the lever arm 5, has a direction pointing right in front of the common articulation 9. When an animal tries to enter the housing 1 in order to reach the bait placed in its interior, it will arrive in contact with the sensing arm 5b, which brings about a slight inwards pivoting of the same, so that the force of the spring shackle 3 acting upon the articulated system gets a direction pointing to the other side of the articulation 9, which means that the arm 8 not longer can retain the spring shackle 3, which consequently pivots in upwards direction to the position shown in FIG. 2, in which the clamping bar 3b under bias of the spring moves towards the top side of the housing and thus causes an efficient and immediate killing of the animal.

It is easy thereafter to empty the trap without manually touching the animal, this being carried out by turning the trap, so that the entrance points downwards and the spring shackle 3 is pressed-in in direction towards the housing 1, whereby the animal falls out. Thereafter the triggering arm 8 and the sensing means 5 by means of a simple movement of one's finger can be returned to the position illustrated in the activated condition illustrated in FIG. 3.

In the embodiment shown in FIGS. 6-9 the spring shackle 13 extends from a stop dog 20 provided along one side of the housing near to its front portion, and via a supporting bracket 22 provided on the rear wall 21 of the housing in forwards direction along the other side of the housing penetrating into a vertically extending opening 23 in the side of said housing, from where it continues inside the housing blending into a cross-directed clamping bar 13b. The spring shackle 13 is under such a tension that the clamping bar 13b tends to move towards the roof of the housing. In this embodiment the sensing member 15 comprises a one-armed lever, which from the outside of the housing through an opening made in the roof extends into its interior. The arm 15 has an upwards facing stop 24, which cooperates with a corresponding stop provided on the housing. The arm 15 is suspended in pivotable mounting on one end portion 25a of the leg of a holder yoke 25, which with its other end portion 25b is hinged to the lower portion of the housing 11, the axis of articulation having a direction extending along the housing. This means that the holder yoke 25 is pivotable in the cross direction of the housing and away from the same, when the sensing member 15 is drawn out. The holder yoke 25 in addition has a bent stop portion 25c, which, when it is in the position illustrated in FIG. 6, is adapted to retain the spring shackle 13 in the activated pivoting position, when the sensing member 15 occupies the stop position illustrated in FIG. 6. When the sensing member 15 is touched, it is pivoted in such a way that its locking cooperation with the housing is discontinued, whereby the spring shackle 13 is released, while the sensing member 15 is extracted out of the housing, whereby the clamping bar 13b moves in direction towards the roof of the housing resulting in the same action taking place as in connection with the first mentioned trap. As in the previous example an emptying operation and renewed application of tension can easily be performed with a simple movement of one's hand without the animal or any other contents of the trap having to be touched.

In the embodiment shown in FIGS. 10-12 the spring shackle 33 extends from the underside of the housing 31, where the spring shackle lies against the housing by means of a transversally extending portion 33a over supporting projections 42 provided on the rear end wall of the housing, continuing along the opposite side of the housing, crossing its roof by means of a transversally extending portion 33c and penetrating into the housing, in which it blends into a transversally extending portion 33b, which forms a clamping bar in the same manner as in the previously described embodiments. Also in this embodiment the sensing member 35 extends downwards through the housing. The sensing member exhibits a projection 45 for a stopping action and cooperates with the wall of the housing. A locking arm is indicated with 46 and extends between a stop 47 near to the entrance opening 32 of the housing and the upper end portion of the sensing member 35. Near to its front end the locking arm 46 is hinged to the upper transversally extending portion 33c of the locking shackle. The spring shackle 33 is subjected to such a tension that it tends to move the clamping bar 33b in upwards direction to the roof of the housing. This movement is impeded in the locking position of the locking arm 46 illustrated in FIG. 12, which keeps the sensing member abutting against the roof of the housing at the same time as said sensing member is lying against the stop dog 47 of the housing. When the sensing member 35 is touched, the contact between the projecting dog 45 and the housing is discontinued, whereby the locking arm 46 can be pivoted counter clockwise according to FIG. 12, which means that also its contact with the stop 47 is discontinued and that the spring shackle 33 pivots the clamping bar 33b against the roof to the housing with a resulting clamping action corresponding to the previously described embodiments.

In the embodiment illustrated in FIGS. 13 and 14 the trap like the other described embodiments comprises a tunnel shaped housing 31, which is open at one of its sides. This entrance side is indicated with 52. A spring shackle is indicated with 53, which with a transversally extending portion 53a lies against the top side of the housing and in addition is held in place by means of a stop dog 61 projecting outwards from the housing. From this transversally extending portion the spring shackle extends along one side of the housing and over its rear end wall, to which the shackle is held in the interspace between two projections 62 and 63 projecting from said end wall. The spring shackle from the rear end wall extends along the other longitudinal side of the housing in a diagonally upwards pointing direction towards its entrance end, at which the spring shackle through an opening 64 made in the top side of the housing penetrates down into the interior of the housing, where it blends into a clamping bar 53b extending in the cross direction of the housing. A portion 53c of the spring shackle extending in the transversal direction of the housing and located above the housing near to its entrance end is in the set condition of the trap kept in a downwards moved position against bias of the springing force of the spring shackle by means of a locking arm 76, which from a shaft 77 located at the entrance end of the housing extends in direction towards a sensing member 55, which from the interior of the housing extends upwards through its top wall to a pivoting shaft 78, which is supported by a projection 79 projecting upwards from the top side of the housing. Also in this embodiment the sensing member 55 is designed as a plate of U-shaped section. The upper end portion of the plate has a pressed-out portion 55a, which forms a stop dog for the free end portion of the locking arm 76 in the set trapping condition of the trap shown. When the lower portion of the sensing member 55 is moved in direction to the right in accordance with the drawing, the pressed-out portion 55a is moved away from the locking arm 76, which by action from the spring shackle 53 is pivoted in upwards direction together with said locking arm, whereby the clamping bar 53b moves in upwards direction towards the top wall of the housing. The trap is suitably set by pressing down the spring shackle 53 in direction towards the upper wall of the housing at the same time as the locking arm 76 is pivoted downwards to the position shown, and the sensing member 55 is pivoted forwards to its locking position either by the trap being tilted with the opening pointing downwards or by exercising a light pressure against the rear side of the sensing member.

In the embodiment shown in FIGS. 15-17 the trap comprises a tunnel shaped housing 81 as in the previous embodiments. The entrance opening is indicated with 82. A spring shackle 83 is with one end portion 83a from the rear end of the housing 81 inserted into a bore 81a of the same. From this bore the spring shackle extends in upwards direction and along the top side of the housing in its longitudinal direction. Near to the entrance opening of the housing the spring shackle 83 extends downwards into the same and is terminating in a clamping bar 83b extending across said entrance opening. A sensing member is indicated with 85 and comprises a plate bent into U-shaped cross-section and extending through an opening 81b made in the top wall of the housing. Above the top wall of the housing the plate 85 is pivoted on a pin 91, which is supported by ears 92 projecting upwards from the top wall of the housing. The sensing member 85 is designed in the shape of a double-armed lever with one short arm projecting upwards past the pivot 91. The upwards projecting arm 85a of the sensing member has a recess 93, into which the upper portion of the spring shackle 93 can be introduced, as is shown in the drawing. The arm 85 has a portion 85a', which is bent in its transversal direction of the arm and is parallel to the pivot 91, which portion extends across the recess 93. The passage between the lateral edge 93a of the recess and the corresponding edge of the bent portion 85a' is formed by an oblique edge 94.

In a condition, in which the shackle 83 is pressed down into the recess 93 and moved towards the lateral edge 93a of the recess, said shackle is held abutting to the underside of the bent end portion 85a' of the sensing member 85. When the sensing member is pivoted in clockwise direction according to FIG. 17, the bent portion is no longer capable of retaining the spring shackle 83, as its oblique surface forms a sliding guide for the shackle, which is moved aside past the bent portion at the same time as it moves out of the recess 93 of the sensing member on account of the springing force of the shackle 83. The clamping bar 83b in this connection moves in upwards direction, as was also the case in the previously described embodiments.

In the embodiment shown in FIGS. 18-20 the trap comprises a housing 101, which is closed at one side as in the design of the previous embodiments. The entrance opening of the housing is indicated with 102. A shackle made of spring material is indicated with 103 and extends from a hole 101a made in the rear portion of the housing in upwards direction between two projections 101b projecting from the rear end wall of the housing. The shackle further extends over the top wall of the housing in its longitudinal direction and down through this wall via an opening 110 with a portion 103c, which at its bottom terminates in a clamping bar 103b extending in the cross direction of the housing. In this embodiment the sensing member 105 comprises a one-armed lever, which above the housing is journalled on a shaft 111 supported by a projection 112 projecting in upwards direction from the top side of the housing. The portion 105a of the sensing member, which projects through the top wall of the housing, is on one side provided with a projection 113, which has a downwards facing edge portion of a stop 113a in the illustrated set condition of the trap having a surface, which is substantially parallel to the top wall of the housing, and an oblique edge portion 113b, which is located in front of the edge portion of the stop 113a. When the sensing member 105 is moved in inwards direction, i.e. in direction to the left according to the FIGS. 19 and 20, the oblique edge portion 113b forces the spring shackle to move sidewise, so that it slides off from the edge portion of the stop 113a and thus is freed therefrom, so that the clamping bar can move freely in upwards direction. The setting of the trap can suitably be carried out in such a way that the spring shackle is moved in downwards and sidewise direction after the sensing member has been moved into the position illustrated in the drawing, the shackle 103 being held abutting against the edge portion of the stop 113a of the projection 113.

The invention is not limited to the above described and in the drawings illustrated embodiments given by way of example only, which can be varied as to their details within the scope of the following claims without therefore departing from the fundamental idea of the invention. Thus it is by way of example within the scope of the invention to use a clamping means, which does not necessarily have to strike against the inside of the housing. The clamping means also needs not move vertically. It is of course also possible that it moves horizontally. The device might also be provided with in between them cooperating clamping means performing movements in opposite directions.

I claim:

1. Animal trap for animals of small size such as rats, mice and the like, comprising a tunnel shaped housing having an entrance opening at one end thereof, a spring shackle having integrally formed at one end thereof a clamping bar disposed inside said housing having a locked position and a clamping position inside said housing, another portion of said spring shackle extending along the outside of said housing, and a sensing member inside said housing which is located at a position more remote from said entrance opening than said clamping bar but nearer to said opening than where a bait is placed, said sensing member being pivoted on said housing and extending through one wall of the housing and having a triggering arm pivoted on a portion of said sensing member disposed outside of said housing engageable with said other portion of said spring shackle to hold said clamping bar in the locked position, said triggering arm and sensing member forming an articulated system of the overcenter type for actuation of said spring shackle such that upon the pivoting of said sensing member the direction of the force with which the spring shackle acts upon the articulation system is displaced from one side of the common articulation of the articulation system to the other side of said articulation to release said spring shackle, the frictional force between said triggering arm and spring shackle being very small whereby when the sensing member is contacted by a very small force, it will move to trigger said spring shackle to move said clamping bar in the cross-direction of said housing from said locked position into said clamping position.

2. Animal trap according to claim 1 wherein said spring shackle when triggered moves said clamping bar into abutment against said one wall of said housing.

* * * * *